United States Patent [19]

Benson

[11] Patent Number: 4,517,704
[45] Date of Patent: May 21, 1985

[54] WINDSHIELD WASHER APPARATUS

[76] Inventor: Robert D. Benson, 2521 Cedar Ave., White Bear Lake, Minn. 55110

[21] Appl. No.: 505,193

[22] Filed: Jun. 17, 1983

[51] Int. Cl.³ .............................................. B60S 1/48
[52] U.S. Cl. .................................................. 15/250.04
[58] Field of Search ........... 15/250.01, 205.02, 250.03, 15/250.04, 250.36, 250.42

[56] References Cited

U.S. PATENT DOCUMENTS

| 3,178,750 | 4/1965 | Goldberg et al. | 15/250.04 X |
| 3,793,666 | 2/1974 | Brillenburg Wurth | 15/250.04 |
| 3,854,161 | 12/1974 | Benson | 15/250.04 |

FOREIGN PATENT DOCUMENTS

| 2216752 | 10/1973 | Fed. Rep. of Germany | 15/250.04 |
| 801989 | 9/1958 | United Kingdom | 15/250.04 |

*Primary Examiner*—Peter Feldman
*Attorney, Agent, or Firm*—Merchant, Gould, Smith, Edell, Welter & Schmidt

[57] ABSTRACT

A winshield washer apparatus (10) for removable attachment to a wiper blade (12) in a substantially parallel contiguous relationship for oscillation with the wiper blade (12) is disclosed. The washer attachment (10) includes an elongated member (14) defining a generally U-shaped cross section and including adjacent one side thereof a tubular portion (16) extending the longitudinal extent of the elongated member (14), the tubular portion (16) defining a plurality of apertures (18) therein. The elongated member (14) further includes adjacent an opposite side thereof, a U-shaped channel portion (20) extending longitudinally of the elongated member (14). An elongated, hollow tubing (22) removably retained by the U-shaped channel portion (20) is interconnected at one end to an open end of the tubular portion (16) and at the other end to a conduit from a cleaning solution source. Accordingly, the washer attachment (10) of the present invention may be interconnected to a cleaning solution source and removably attached to the wiper blade (12) for oscillation therewith so as to deliver cleaning solution directly onto the surface of the windshield.

13 Claims, 4 Drawing Figures

U.S. Patent    May 21, 1985    Sheet 1 of 2    4,517,704
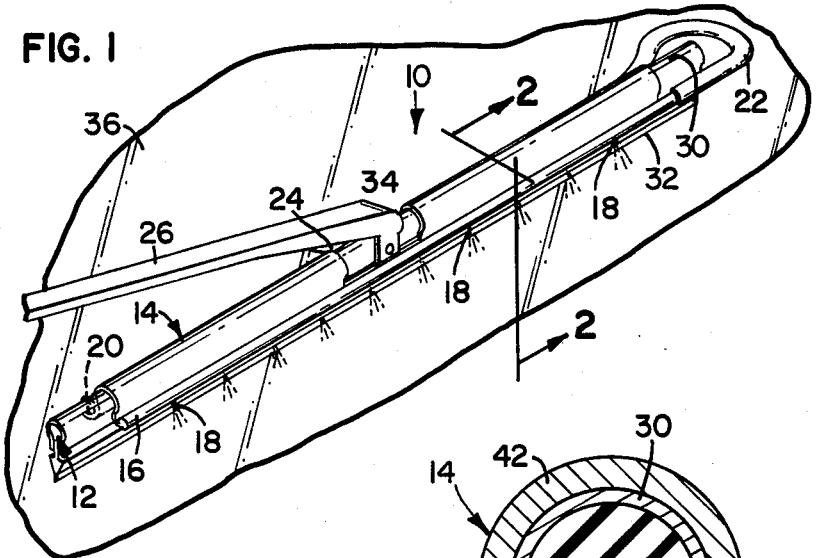
FIG. 1
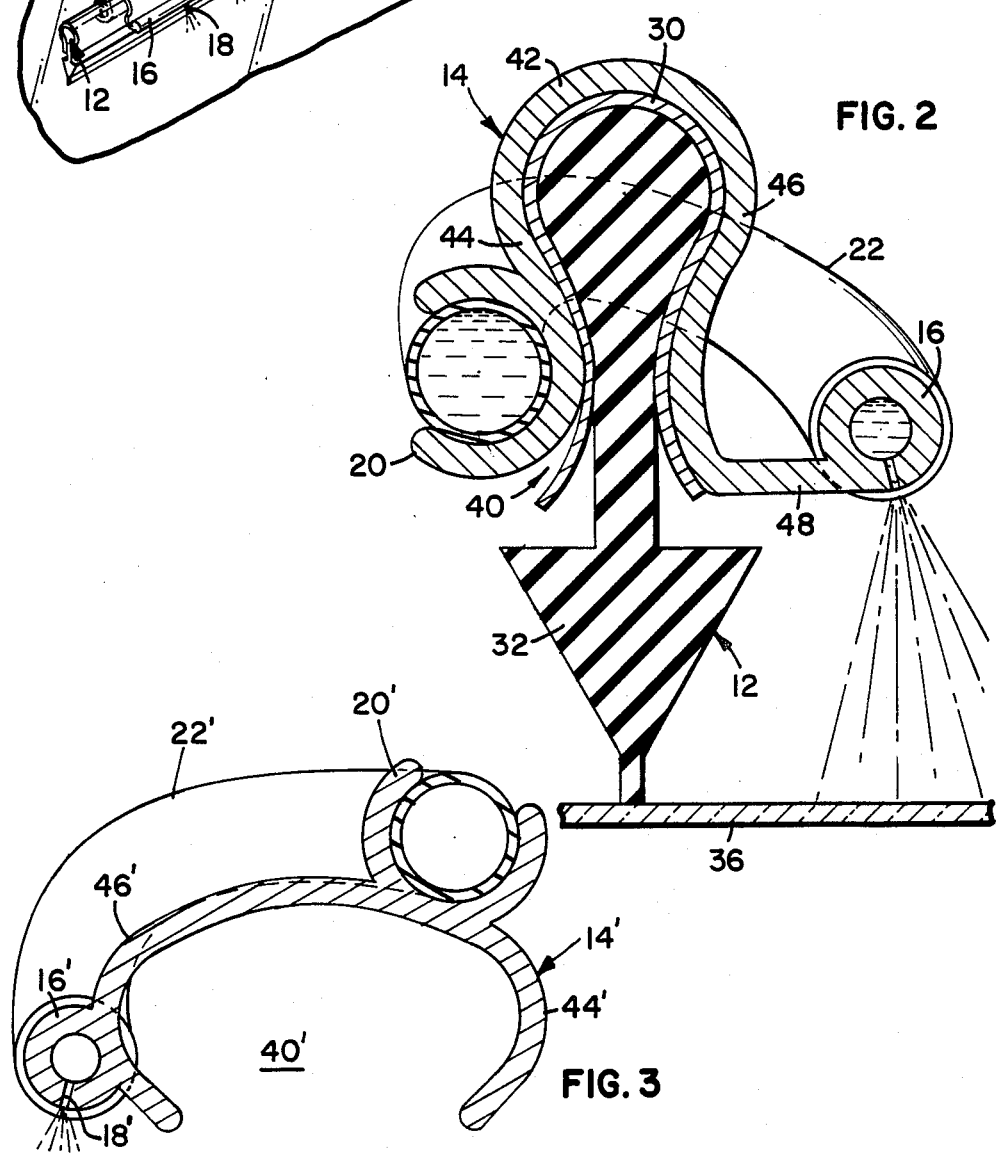
FIG. 2
FIG. 3

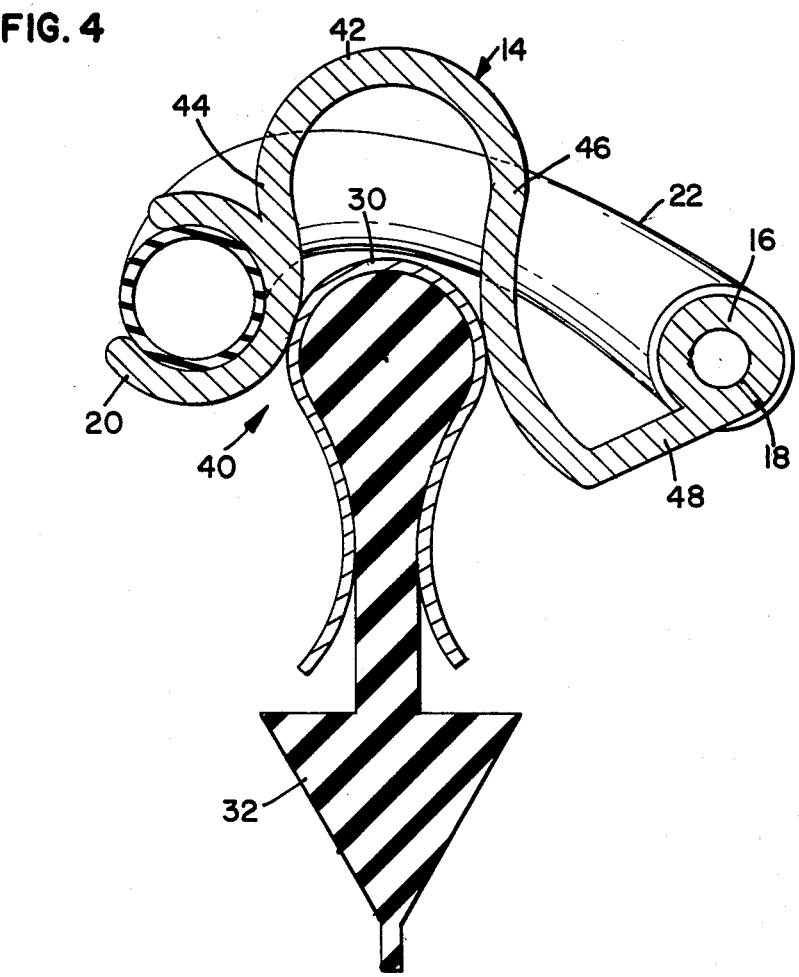

WINDSHIELD WASHER APPARATUS

The present invention relates to a windshield washer apparatus and more particularly, a washer apparatus for oscillation with a wiper blade.

The present invention may be used for cleaning the windshields of vehicles utilizing relatively straight, rigid wiper blades. The present invention is especially important in connection with commercial vehicles which typically are kept in motion for lengthy periods and/or subjected to dirty conditions, and for safety reasons, should have a windshield washer apparatus which functions reliably under variations of speed, weather and adverse highway conditions. Conventional single spray washing jets for washing vehicle windshields all too frequently are not reliable in squirting the washing fluid upon the windshield.

The applicant in previous U.S. Pat. Nos. 3,854,161 and 3,757,379 discloses two different techniques for attaching a windshield washer apparatus to yoke wiper structures. While providing substantial improvement over the prior art, the windshield washer apparatus disclosed in these patents have various problems associated therewith. For example, U.S. Pat. No. 3,757,379 discloses a windshield apparatus for a yoke type wiper blade which includes a resiliently flexible plastic tube having a plurality of apertures therein. U.S. Pat. No. 3,854,161 discloses a windshield washer apparatus for adhesive attachment to a wiper blade. Among others, one problem with this apparatus is that the washer apparatus is permanently affixed to the wiper blade and cannot be readily removed therefrom. Accordingly, the washer apparatus must be thrown away when the blade is thrown away.

Many currently available washer apparatus are rather complex and do not provide an economy of design. Furthermore, many of the washer apparatus currently available are rather difficult to install for an unskilled person.

The present invention solves these and many other problems associated with existing washer apparatus.

SUMMARY OF THE INVENTION

The present invention relates to a reusable windshield washer attachment apparatus for a rigid wiper blade, the wiper blade having a relatively straight rigid spline portion and a flexible wiper blade portion attached thereto for making contact with the surface of the windshield. The washer attachment includes an elongated elastic member having a generally U-shaped cross section and defining a cavity extending the longitudinal extent thereof. The elongated elastic member is configured for releasable receipt of the spline portion of the wiper blade so as to enable releasable attachment of the elongated elastic member to the wiper blade for oscillation therewith. The elongated member is in a substantially parllel contiguous relationship to the wiper blade when removably attached thereto. The elongated flexible member includes integral therewith a hollow tubular portion extending longitudinally along one side of the elongated flexible member. The tubular portion has a plurality of longitudinally spaced apertures therein. The tubular portion is positioned substantially parallel and is laterally juxtaposed relative to the wiper blade. The tubular member includes a closed end and an open end. The elongated member further includes integral therewith a U-shaped channel portion extending longitudinally along the side of said elongated flexible member opposite said hollow tubular portion. The U-shaped channel portion is in a substantially parallel and laterally juxtaposed relationship relative to the wiper blade. An elongated hollow flexible tubing is interconnected at a first end to a source of cleaning solution. The flexible tubing is removably retained by the U-shaped channel portion in a laterally juxtaposed relationship relative to the wiper blade. A second end of the tubing is interconnected to the open end of the elongated tubular portion.

The present invention provides for a washer apparatus which is removably attached to a relatively straight, rigid windshield wiper blade such as commonly utilized on trucks and the like. The present invention is readily installed and may be readily removed when the washer blade is replaced. Furthermore, the present invention may be readily installed by one who is unskilled, requiring that the washer attachment simply be placed over the rigid blade and snapped into position.

Furthermore, one embodiment of the present invention is made as an integral unit by an extrusion process. In one embodiment, the present invention is made from an extrudable durable plastic which is resistant to salt and temperature extremes.

The present invention is particularly advantageous in that it may be readily installed and removed when a wiper blade is disposed of and replaced. Furthermore, the present invention is an add-on washer apparatus which may be installed on many existing rigid wiper blades.

In yet another embodment of the present invention, the washer attachment is integral with the wiper blade. The washer and wiper structure might in certain applications be made by a bidurometer extrusion process.

In yet another embodiment of the present invention, the tubular element is interconnected directly to a source of cleaning solution. In this embodiment a structure for retaining a flexible tubing on the wiper blade is not required.

These and various other advantages and features of novelty which characterize the invention are pointed out with particularity in the claims annexed hereto and forming a part hereof. However, for a better understanding of the invention, its advantages, and objects attained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views, FIG. 1 is a view in perspective of a preferred embodiment of the present invention;

FIG. 2 is an enlarged sectional view as seen generally along line 2—2 in FIG. 1;

FIG. 3 is a sectional view of an alternate embodiment of the present invention; and FIG. 4 is a cross sectional view illustrating the washer attachment being snapped onto or removed from the wiper blade.

DETAILED DESCRIPTION OF A PREFERRED EMBODIMENT

Referring now to the drawings, there is illustrated in FIGS. 1 and 2 a preferred embodiment of the washer apparatus of the present invention, generally referred to by the reference numeral 10. The preferred embodiment of the present invention is intended for removable attachment to a relatively straight, rigid wiper blade 12 in a substantially parallel, contiguous relationship for oscillation with the wiper blade 12. The washer attachment apparatus 10 includes an elongated member 14 having a generally U-shaped cross section. The elongated member is preferably somewhat elastic and includes adjacent one side thereof a tubular portion 16, the tubular portion 16 defining a plurality of apertures 18 therein and extending longitudinally of the elongated member 14. The washer attachment apparatus 14 further includes adjacent an opposite side thereof a U-shaped channel portion 20 extending longitudinally of the elongated member 14. An elongated, hollow flexible tubing 22 is removably retained by the U-shaped channel portion 20 and interconnected at one end thereof to an open end of the tubular portion 16 and at the other end thereof to a conduit from a cleaning solution source.

In FIG. 1, the flexible tubing 22 is illustrated as being interconnected to a conduit 24 mounted on an oscillating wiping arm 26. It will be appreciated that the interconnection of the flexible tubing 22 to the cleaning solution source might be made at varyaing positions depending on the configuration of the wiper system and its associated cleaning solution source.

Accordingly, the washer attachment 10 of the present invention may be interconnected to a cleaning solution source of the vehicle and removably attached to the wiper blade 12 thereof for oscillation therewith so as to deliver cleaning solution directly onto the surface of the windshield. Furthermore, this may be readily accomplished with the preferred embodiment by simply snapping the elongated member 14 into place on the wiper blade 12, requiring no particular skill. Additionally, the preferred embodiment of the present invention may be easily and inexpensively made by conventional extrusion process.

More particularly, the washer attachment apparatus 10 of the present invention is intended for use with a relatively rigid wiper blade like that commonly used with commercial trucks and other vehicles. As illustrated in FIGS. 1 and 2, the rigid wiper blade will typically have a relatively straight rigid spline portion 30 and a flexible wiper blade portion 32 which may be removably or fixedly attached to the spline portion. The wiper blade 12 is attached to the oscillating wiper arm 26 by a suitable mounting bracket 34 for oscillating motion across the surface of a windshield 36 such that the flexible wiper blade portion 32 makes contact with the surface of the windshield 36.

The preferred embodiment of the washer attachment apparatus 10 of the present invention includes the elongated elastic member 14 which is preferably made as an integral unit from an extrudable plastic which is durable, salt-resistant, resistant to temperature extremes, and generally suitable for the operating environment to which windshield washer apparatus are subjected. It will be appreciated that the elongated member 14 may be made by conventional extrusion methods as a single integral unit. Furthermore, a number of well known plastic compositions may be utilized. In one application, a plastic known by the trademark NORYL (a trademark of General Electric) and having a product number of PX 1005 is utilized. As further illustrated in FIG. 2, the elongated elastic member 14 has a generally U-shaped cross sectional configuration defining a cavity 40 extending the longitudinal extent thereof. When positioned on the wiper blade 12, the cavity 40 is downwardly opening. The elongated elastic member 14 includes curvilinear topwall member 42, and two curvilinear sidewall members 44, 46. In the preferred embodiment, the sidewall members 44, 46 are separated at some point therealong by a distance which is less than the thickness of the spline portion 30. Furthermore, the elongated elastic member 14 is resiliently deformable between a deformed or disturbed state wherein the sidewalls 44, 46 are further apart as generally illustrated in FIG. 4 and a normal state wherein the sidewalls 44, 46 are closer together, the sidewalls 44, 46 tending to return to the normal state when forced into the deformed state. Accordingly, the elongated elastic member 14 functions as a snap-on element such that the sidewalls 44, 46 are deformable to enable the elongated member 14 to be positioned over the spline portion 30 of the wiper blade and yet retain the elongated member 14 on the spline portion of the wiper blade when in position. Furthermore, the elongated member 14 may be readily removed by forcing the member 14 upward such that the sidewalls 44, 46 are forced further apart into the deformed state.

In one particular application, the sidewalls 44, 46 at their closest point to one another are separated by approximately 0.088 inches when utilized with a blade which has a width at that point of approximatley 0.115 inches. Accordingly, it will be appreciated that even when fully positioned onto the wiper blade 12, the sidewalls 44, 46 will be forcing inward against the spline portion 30 so as to removably retain the elongated member 14 in position.

Once removably attached to the wiper blade 12, the elongated member oscillates with the wiper blade 12. Furthermore, the elongated member in the preferred embodiment is positioned in a substantially parallel contiguous relationship to the wiper blade 12.

Furthermore, the sidewalls 44, 46 provide the bottom portion of the cavity 40 with a width which is less than the width of the top portion of the cavity 40. Accordingly, not only is there frictional engagement between the sidewalls 44, 46 and the spline portion 30 of the wiper blade, not in order to remove the elongated member 14, the sidewalls 44, 46 must be forced further apart into the deformed state so as to enable the top portion of the blade 12 to pass through the bottom portion of the cavity 40.

In the preferred embodiment as illustrated in FIGS. 1 and 2, the elongated flexible member 14 includes integral therewith the hollow tubular portion 16 which extends longitudinally along one side of the elongated flexible member 14. In the preferred embodiment shown, the tubular portion 16 is positioned near the bottom of the sidewall 46 on a horizontally extending flange portion 48. The tubular portion 16 includes a plurality of the longitudinally spaced apertures 18. As illustrated, in the preferred embodiment the tubular portion 16 lies in a substantially parallel and laterally juxtaposed relationship relative to the wiper blade 12. In the embodiment shown, the tubular portion 16 includes a closed end and an open end providing for fluid communication with the cleaning solution source. It will be appreciated that in alternate embodiments of the present invention the tubular portion might include an access port for fluid communication at some other location therealong. For example, the tubular portion 16 might include an access port intermediate the ends thereof.

Additionally, the tubular portion, while being integral with the elongated member 14 in the preferred embodiment, might be made separate from and attached to the elongated member 14.

Furthermore, the elongated member 14 might include two such tubuar portions, there being one tubular portion positioned on each side of the elongated member 14. It will be appreciated that the tubular portions might be interconnected for fluid communication therebetween or each tubular portion might be individually interconnected to the source of cleaning solution.

Preferably, as illustrated in FIG. 2, the apertures 18 are directed toward the surface of the windshield 36. Preferably, the apertures are located along the longitudinal edge of the wiper blade 12 facing in a downward direction throughout a majority of the wiping action. In the preferred embodiment, the apertures 18 are preferably oriented at a 15-to35-degree angle from the vertical axis of the tubular portion 16, the apertures 18 being directed away from the wiper blade and toward the windshield as generally illustrated in FIG. 2.

Accordingly, as the wiper blade 12 oscillates across the windshield 36, the tubular portion 16 delivers the cleaning solution directly onto the surface of the windshield 36 thereby assuring that cleaning solution is evenly distributed over the surface of the windshield throughout the wiping action. In certain applications, the Applicant has found that providing the apertures with a diameter of 0.021 of an inch and positioning the apertures one inch apart provides for adequate cleaning of the windshield.

As illustrated further in FIG. 2, the elongated member 14 further includes the U-shaped channel portion 20 extending longitudinally generally along the sidewall 44. The U-shaped channel portion 20 is positioned in a substantially parallel and laterally juxtaposed relationship relative to the wiper blade 12. As further illustrated in FIG. 2, the U-shaped channel portion has curvilinear wall portions configured for removably retaining the flexible tubing 22 in a cavity 50 formed by the U-shaped channel portion 20.

As illustrated in FIG. 2, the wall portions of the elongated member 14 and its integral tubular portion 16 and U-shaped channel portion 20 are uniform throughout. In one application, the Applicant has found a thickness of approximately 0.035 to 0.040 inch or approximately one millimeter to be appropriate.

The elongated hollow flexible tubing 22 is illustrated in FIG. 1 as being interconnected at a first end to conduit 24 from the source of cleaning solution. The flexible tubing 22 is removably retained by the U-shaped channel portion 20 in a laterally juxtaposed relationship relative to the wiper blade 12. A second end of the flexible tubing 22 is interconnected to the open end of the elongated tubular portion 16. The flexible tubing 22 is suitably attached onto the end of the tubular portion 16 by such techniques as friction or adhesive bonding. The flexible tubing 22 is preferably made from a vinyl material, more preferably neoprene.

In alternate embodiments of the present invention, the flexible tubing 22 might interconnect to the tubular portion 16 intermediate the ends thereof. Accordingly, the requirement of the U-shapeld channel portion 20 might be done away with as the flexible tubing 22 might be interconnected directly between the source of the cleaning solution and the tubular portion 16 without being otherwise retained on the wiper blade by the U-shaped channel portion 20. Preferably, the sidewalls of the U-shaped channel portion 20 will extend about approximately three-quarters of the circumference of the tubing. The Applicant has found that a flexible tubing 22 having an inside diameter of one-sixteenth inch and an outside diameter of one-eighth inch to be appropriate for certain applications.

The embodiment of the present invention shown in FIGS. 1 and 2 is intended for use with a straight rigid wiper blade having a cross section often referred to as the "keyhole" design. The keyhole wiper blade provides for a disposable wiper portion 32 and is therefore very popular. However, other wiper blade configurations are utilized in the marketplace. Accordingly, the elongated member 14 of the present invention may be configured for use with these various types of rigid wiper blades. For example, illustrated in FIG. 3 is an alternate embodiment of the present invention configured for use with a wiper blade having a differing cross section (primed reference numerals indicating the various elements).

As illustrated in FIG. 1, most wiper blades 12 will be interconnected to the oscillating wiper arm 26 by a suitable wiper bracket 34 enabling the wiper blade 12 to pivot with respect to the wiper arm 26 as it oscillates across the surface of the windshield 36. Accordingly, the preferred embodiment, an intermediate portion generally designated by the reference numeral 52 of the elongated member 14 is cut away such that the bracket 34 does not interfere with insertion of the elongated member 14 onto the wiper blade 12. As illustrated in FIG. 1, although the top wall 42 and sidewalls 44, 46 are largely cut away, the tubular portion 16 is not disturbed.

It will be appreciated that in yet other embodiments of the present invention, the tubular portion—16 might be extruded as an integral unit with the wiper blade 32. This might be accomplished using bidurometer extrusion techniques. However, such an embodiment of the present invention would not enable removal of the washer apparatus when the wiper blade 12 was disposed.

It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principle of the invention, to the full extent indicated by the broad general meaning of the terms in which the appended claims are expressed.

What is claimed:

1. A reusable windshield washer attachment apparatus for a rigid wiper blade, the wiper blade having a relatively straight rigid spline portion and a flexible wiper blade portion attached thereto for making contact with the surface of the windshield, the washer attachment comprising:
   (a) an elongated elastic member having a generally U-shaped cross section defining a cavity extending the longitudinal extent thereof, the elongated member being configured for releasable receipt of the spline portion of the wiper blade, the elongated elastic member including a topwall member and two spaced apart sidewall members, the elongated elastic member being resiliently deformable between a disturbed state and a normal state, the sidewall members being spaced farther apart in the disturbed state than in the normal state, the sidewall members tending to return to the normal state when forced into the disturbed state, the sidewall members being separated at some point therealong by a distance which is less than the thickness of the spline portion when in the normal state, whereby the sidewalls engage the spline portion to removably retain the washer attachment on the spline portion, said elongated member being in a substantially parallel contiguous relationship to the wiper blade when removably attached thereto;

(b) said elongated member including integral therewith a hollow tubular portion extending longitudinally along one side of said elongated member, said tubular portion having a plurality of longitudinally spaced apertures therein, said tubular portion being in a substantially parallel and laterally juxtaposed relationship relative to the wiper blade, said tubular portion including a closed end and an open end;

(c) said elongated member further including integral therewith a U-shaped channel portion extending longitudinally along a side of said elongated member opposite said hollow tubular portion, said U-shaped channel portion being in a substantially parallel and laterally juxtaposed relationship relative to the wiper blade; and (d) an elongated hollow flexible tubing interconnected at a first end to a source of cleaning solution, said flexible tubing being removably retained by said U-shaped channel portion in a laterally juxtaposed relationship relative to the wiper blade, a second end of said tubing being interconnected to said open end of said elongated tubular portion.

2. A washer attachment apparatus in accordance with claim 1, wherein said elongated member is an integral one-piece unit.

3. A washer attachment apparatus in accordance with claim 2, wherein said elongated member is made by a plastic extrusion process.

4. A washer attachment apparatus in accordance with claim 2, wherein said flexible tubing is made from a vinyl material.

5. A washer attachment apparatus in accordance with claim 1, wherein the walls of said elongated member are of substantially the same thickness.

6. A washer attachment in accordance with claim 1, wherein said cavity defined by said U-shaped cross section of said elongated member is narrower near a bottom portion thereof than at a top portion thereof.

7. A washer attachment apparatus in accordance with claim 1, wherein the apertures of said tubular portion face generally in the direction of the windshield.

8. A washer attachment apparatus in accordance with claim 1, wherein a portion of said elongated member is cut away intermediate the ends thereof to enable said elongated member to be positioned over the wiper arm attachment to the wiper blade.

9. A washer attachment apparatus in accordance with claim 1, wherein said tubular portion is positioned adjacent the side of the wiper blade facing downward during a majority of the wiping action.

10. A washer attachment apparatus in accordance with claim 8, wherein said apertures are oriented at a fifteen to thirty-five degree angle from the vertical axis of said tubular portion, said apertures directed away from the wiper blade and toward the windshield.

11. A removable windshield washer attachment apparatus for a rigid wiper blade, the wiper blade having a relatively straight rigid spline portion and a flexible wiper blade portion attached thereto for making contact with the surface of the windshield, the washer attachment comprising:

(a) an elongated elastic snap-on element having a generally U-shaped cross section, said snap-on element being resiliently deformable between a deformed state and a normal state, said snap-on element being in said deformed state when attached to the spline of the wiper blade, said snap-on element tending to return to said normal state from said deformed state, said snap-on element engaging the spline of the wiper blade to remain removably attached thereto and oscillate therewith, said elongated snap-on element being in a substantially parallel contiguous relationship to the wiper blade when releasably attached thereto; and (b) a hollow tubular element of one piece with said elongated snap-on element extending longitudinally along one side of said elongated snap-on element, said hollow tubular element defining a plurality of apertures therein, said tubular element including a fluid access port enabling fluid communication therewith by a source of cleaning solution.

12. A washer attachment apparatus in accordance with claim 11, wherein said tubular element has one end which is open, said open end providing said access port to said tubular element, said tubular element being interconnected to a source of cleaning solution by a flexible tubing attached to the open end of said tubular element and interconnected to the source of cleaning solution.

13. A washer attachment apparatus in accordance with claim 12, wherein said snap-on element includes a structure for retaining said flexible tubing adjacent said snap-on element along at least a portion thereof.

* * * * *